(12) United States Patent
Norlin

(10) Patent No.: US 11,530,021 B2
(45) Date of Patent: Dec. 20, 2022

(54) METHOD AND A SYSTEM FOR POSITION DETECTION

(71) Applicant: VOLVO PENTA CORPORATION, Gothenburg (SE)

(72) Inventor: Ulf Norlin, Slöinge (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 240 days.

(21) Appl. No.: 16/771,138

(22) PCT Filed: Feb. 27, 2018

(86) PCT No.: PCT/EP2018/054819
§ 371 (c)(1),
(2) Date: Jun. 9, 2020

(87) PCT Pub. No.: WO2019/166077
PCT Pub. Date: Sep. 6, 2019

(65) Prior Publication Data
US 2021/0163113 A1   Jun. 3, 2021

(51) Int. Cl.
*G01D 5/14* (2006.01)
*B63H 21/21* (2006.01)
*B63H 20/00* (2006.01)

(52) U.S. Cl.
CPC ............. *B63H 21/21* (2013.01); *G01D 5/145* (2013.01); *B63H 20/00* (2013.01); *B63H 2020/003* (2013.01); *B63H 2021/216* (2013.01)

(58) Field of Classification Search
CPC ...... G01D 5/142; G01R 15/20; G01R 15/202; G01R 21/08; G01R 33/06; G01R 33/07; G01R 33/077
See application file for complete search history.

(56) References Cited

U.S. PATENT DOCUMENTS

| 5,869,962 A | 2/1999 | Kasumi et al. |
| 2003/0150366 A1 | 8/2003 | Kaurmann et al. |

(Continued)

FOREIGN PATENT DOCUMENTS

| CN | 1343979 A | 4/2002 |
| CN | 101603973 A | 12/2009 |

(Continued)

OTHER PUBLICATIONS

International Search Report and Written Opinion dated Oct. 29, 2018 in corresponding International PCT Application No. PCT/EP2018/054819, 10 pages.

(Continued)

*Primary Examiner* — Tung X Nguyen
(74) *Attorney, Agent, or Firm* — Venable LLP; Jeffri A Kaminski

(57) ABSTRACT

A method for using a system including a plurality of first fields and a plurality of second fields fixed to a first device and presenting a first physical characteristic and a second physical characteristic, respectively, the first and second fields being arranged in an alternating manner. First and second sensors are fixed to the second device and arranged to move along the array of fields when the second device moves in relation to the first device. The method includes detecting, by the first sensor and during a movement of the second device in relation to the first device, a transition from the first to the second physical characteristic, or vice versa, simultaneously detecting, by the second sensor, the first or the second physical characteristic, and determining, based on the detected transition and physical characteristic, the direction of movement of the second device in relation to the first device.

15 Claims, 7 Drawing Sheets

(56) References Cited

U.S. PATENT DOCUMENTS

| | | | |
|---|---|---|---|
| 2009/0302833 A1 | 12/2009 | Kawano et al. | |
| 2010/0106452 A1 | 4/2010 | Tatenuma et al. | |
| 2020/0088551 A1* | 3/2020 | Wissel | G01D 5/24461 |
| 2021/0269093 A1* | 9/2021 | Kato | B62D 15/0225 |

FOREIGN PATENT DOCUMENTS

| | | |
|---|---|---|
| CN | 101726627 A | 6/2010 |
| CN | 101743456 A | 6/2010 |
| CN | 106443063 A | 2/2017 |
| DE | 10123539 A1 | 11/2002 |

OTHER PUBLICATIONS

International Preliminary Report on Patentability dated Jan. 27, 2020 in corresponding International PCT Application No. PCT/EP2018/054819, 13 pages.
China Office Action dated Dec. 14, 2021 in corresponding China Patent Application No. 201880081522.5, 5 pages.

\* cited by examiner

METHOD AND A SYSTEM FOR POSITION DETECTION

CROSS-REFERENCE TO RELATED APPLICATIONS

This application is a U.S. National Stage application of PCT/EP2018/054819, filed Feb. 27, 2018, and published on Sep. 6, 2019, as WO 2019/166077 A1, all of which is hereby incorporated by reference in its entirety.

TECHNICAL FIELD

The invention relates to a method for using a system for detecting a position of a second device in relation to a first device. The invention also relates to a computer program, a computer readable medium, a control unit, a marine propulsion control system, and a marine vessel. The invention also relates to a system for determining the position of a second device in relation to a first device.

The invention is not restricted to any particular type of marine vessel. Instead it may be used on any type and any size of marine vessel, water surface vessels as well as submarines. Further, the invention is applicable not only to marine applications. The invention could also be used in other positioning applications, whether for off-center angle or linear positioning applications; examples include excavators and cranes.

BACKGROUND

In a modern marine vessel propulsion system, an accurate indication of the steering position of a propulsion unit is an important requirement for an effective and safe control of the system.

DE10123539 discloses a sensor which scans an element, in which divisions are formed by alternate magnetic poles. The resultant periodic analogue signal is converted into periodic digital signal, which is used to determine the position of one device in relation to another.

However, it is desired, in particular for harsh marine environments, to provide a more secure manner of detecting a position of a device in relation to another device.

SUMMARY

An object of the invention is to provide an improved manner of detecting a position of a device in relation to another device.

The object is reached with a method according to claim 1. Thus, the object is reached with a method for using a system for detecting a position of a second device in relation to a first device,
  the system comprising an array of fields, fixed to the first device, the fields consisting of a plurality of first fields presenting a first physical characteristic, and a plurality of second fields presenting a second physical characteristic, which is different from the first physical characteristic, the first and second fields being arranged in an alternating manner along the array of fields,
  the system further comprising a first sensor and a second sensor, fixed to the second device, wherein the first and second sensors are arranged to move along the array of fields when the second device moves in relation to the first device,
  the first and second sensors being adapted to detect the first physical characteristic or the second physical characteristic in dependence of the positions of the first and second sensors in relation to the fields,
  the method comprising detecting, by means of the first sensor, and during a movement of the second device in relation to the first device, a transition from the first physical characteristic to the second physical characteristic, or vice versa,
  detecting, substantially simultaneously to the transition detection, by means of the second sensor, either the first physical characteristic or the second physical characteristic,
  and determining, based on the detected transition and the detected physical characteristic, the direction of movement of the second device in relation to the first device.

Thereby, the direction of the movement of the second device in relation to the first device can be effectively determined. The determination of the second device movement direction may be allowed by suitable extensions of the fields along the array, and a suitable position of the second sensor in relation to the first sensor.

As an example, during a movement of the array in a first direction, the first sensor detects a transition from the first physical characteristic to the second physical characteristic while the second sensor detects the second physical characteristic. Further, in such an example, during a movement of the array in the first direction, when the first sensor detects a transition from the second physical characteristic to the first physical characteristic, the second sensor detects the first physical characteristic.

In addition, in such an example, during a movement of the array in a second direction, opposite to the first direction, the first sensor detects a transition from the second physical characteristic to the first physical characteristic while the second sensor detects the second physical characteristic. Further, in such an example, during a movement of the array in the second direction, when the first sensor detects a transition from the first physical characteristic to the second physical characteristic, the second sensor detects the first physical characteristic.

Said example may be presented in a table as follows:

| Sensor 1 | Sensor 2 | Direction |
|----------|----------|-----------|
| 1 to 2   | 2        | 1         |
| 2 to 1   | 1        | 1         |
| 2 to 1   | 2        | 2         |
| 1 to 2   | 1        | 2         |

Thus, embodiments of the invention provide unique combinations of transitions and states from which the direction of movement can be determined. Thereby, a robust and secure manner of determining the direction of movement of the second device in relation to the first device is provided. Embodiments of the invention may be implemented with a simple set of hardware. This is particularly advantageous in harsh marine conditions.

The first physical characteristic is a first magnetic polarity, and the second physical characteristic is a second magnetic polarity, which is opposite to the first magnetic polarity. Thereby, a robust, contact-less implementation may be allowed. It should be noted however, that alternatives are possible.

It is understood that in embodiments of the invention, the detection of the transition from the first physical characteristic to the second physical characteristic, or vice versa, is caused by the relative movement of the first sensor from a first field to a second field, or vice versa, respectively.

Preferably, where the fields comprise an extended field, which has, compared to other fields, a larger extension along the array of fields, and the system comprises a third sensor, fixed to the second device, the method comprises determining whether the transition detected by means of the first sensor, or a transition detected by means of the second sensor, is a transition from the first physical characteristic to the second physical characteristic, determining whether a transition, detected by means of the third sensor, and substantially simultaneously to the transition detected by means of the first sensor or the second sensor, is a transition from the first physical characteristic to the second physical characteristic, and determining, based on the determinations whether the transitions were transitions from the first physical characteristic to the second physical characteristic, whether the transitions occurred at opposite ends of the extended field.

Thereby, an advantageous detection of a reference absolute position, herein also referred to as a zero point, of the second device in relation to the first device is provided. Preferably, the distance between the second and third sensors, along the array of fields, is equal to the extension, along the array of fields, of the extended field. Preferably, a plurality of the fields, provided in addition to the extended field, e.g. all remaining fields, have the same extension along the array. In some embodiments, the may be two or more extended fields.

Thereby, when the second and third sensors detect respective transitions which are opposite, i.e. one from the first physical characteristic to the second physical characteristic, and the other from the second physical characteristic to the first physical characteristic, it can be determined that the sensors are at the zero point. It is understood that such transitions occurred at opposite ends of the extended field. Thereby, a robust manner of detecting the reference absolute position is provided.

The object is also reached with a computer program according to claim 6, a computer readable medium according to claim 7, a control unit according to claim 8, a marine propulsion control system according to claim 9, or a marine vessel according to claim 10.

The object is also reached with a system for determining the position of a second device in relation to a first device,
where the system comprises an array of fields, arranged to be fixed to the first device, the fields consisting of a plurality of first fields presenting a first physical characteristic, and a plurality of second fields presenting a second physical characteristic, which is different from the first physical characteristic, the first and second fields being arranged in an alternating manner along the array of fields, wherein the fields comprise an extended field, which has, compared to other fields, a larger extension along the array of fields, the system further comprising a first sensor and a second sensor, arranged to be fixed to the second device, wherein the first and second sensors are arranged to move along the array of fields when the second device moves in relation to the first device, the first and second sensors being adapted to detect the first physical characteristic or the second physical characteristic in dependence of the positions of the first and second sensors in relation to the fields, characterized in that the extensions of the fields along the array, and the position of the second sensor in relation to the first sensor are such that when the first sensor detects, during a movement of the second device in relation to the first device, a transition from the first physical characteristic to the second physical characteristic, or vice versa, the second sensor detects, during the transition, either the first physical characteristic or the second physical characteristic, and in that the system comprises a third sensor arranged to be fixed to the second device, and the distance between the first sensor and the third sensor, or between the second sensor and the third sensor, along the array of fields, is equal to the extension, along the array, of the extended field.

It is understood that the first and second sensors may be adapted to be connected to a control unit for sending signals to the control unit. It is further understood that the fields may be arranged one after the other along the array. A plurality of the fields may have the same extension along the array. All of, or a plurality of, the fields having the same extension along the array, are arranged one after the other along the array. It is understood that the fields may be adjacent to respective neighboring fields. The extended field may have an extension along the array which is twice the extension along the array of other fields.

The system provides for an advantageous combination of the possibility to determine, as described above, by said detections of the first and second sensors, the direction of movement of the second device in relation to the first device, and the possibility to determine, as described above, by means of the third sensor, a reference position of the second device in relation to the first device.

Preferably, the distance between the first sensor and the second sensor, along the array of fields, is equal to a partial field extension, which is less than a full field extension, or equal to the sum of a multiple of a full field extension and a partial field extension, where said full field extension is the extension along the array of any field, or, where the extension along the array of one or more fields is different from the extension along the array of one or more of the remaining fields, the extension along the array of a field having the smallest extension along the array. Thereby it may be secured that the second sensor is located within a field when the first sensor undergoes a transition from one field to another filed. Thereby, an accurate movement direction determination is effectively secured. It is understood that embodiments of the invention may also secure that the first sensor is located within a field when the second sensor undergoes a transition from one field to another field.

Preferably, the first and second sensors are Hall sensors. Preferably, also the third sensor is a Hall sensor. Thereby a robust, contactless implementation is possible. However, alternatives are possible. For example, the first and second sensors may comprise electric coils inducing sinusoidal voltages as they move through the changing magnetic polarity of the array of fields.

The object is also reached with a marine vessel comprising a system according to any embodiment described or claimed herein, wherein one of the first and second devices is fixed in relation to a hull of the marine vessel, and the other of the first and second devices is fixed to a steered part of a propulsion unit of the marine vessel, or to a rudder of the marine vessel.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
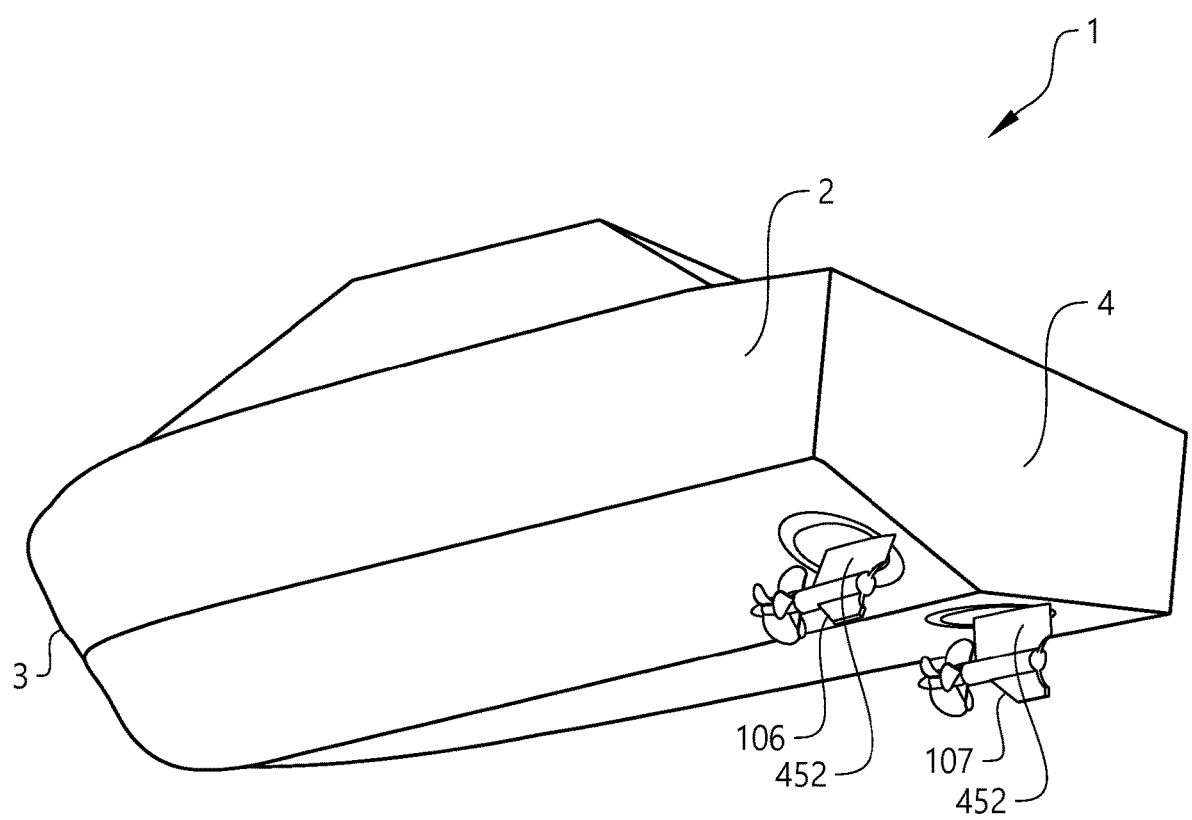
FIG. 1 is a perspective view of a marine vessel.

FIG. 1 shows a marine vessel 1 in the form of a power boat, presenting a bow 3 and a stern 4. Generally, a marine propulsion control system according to an embodiment of the inventive concept may be used in any type of water surface vessel, such as a large commercial ship, a boat for transport of goods and/or people, a leisure boat or another type of marine vessel.

The marine vessel comprises a first propulsion unit 106 and a second propulsion unit 107. The propulsion units 106, 107 protrude from a lower side of a hull 2 of the vessel 1. The first and second propulsion units 106, 107 are in this example respective pod drives. Each propulsion unit 106, 107 is arranged to deliver thrust to water in which the vessel 1 is floating to thereby provide a propulsive force to the vessel. For this each propulsion unit 106, 107 comprises, in this example, two coaxial and counter-rotating propellers. It should be noted that the invention is equally applicable to other types of propulsion units, such as stern drives, fixed propeller and rudder combinations, or outboard engines.

Figure 2:
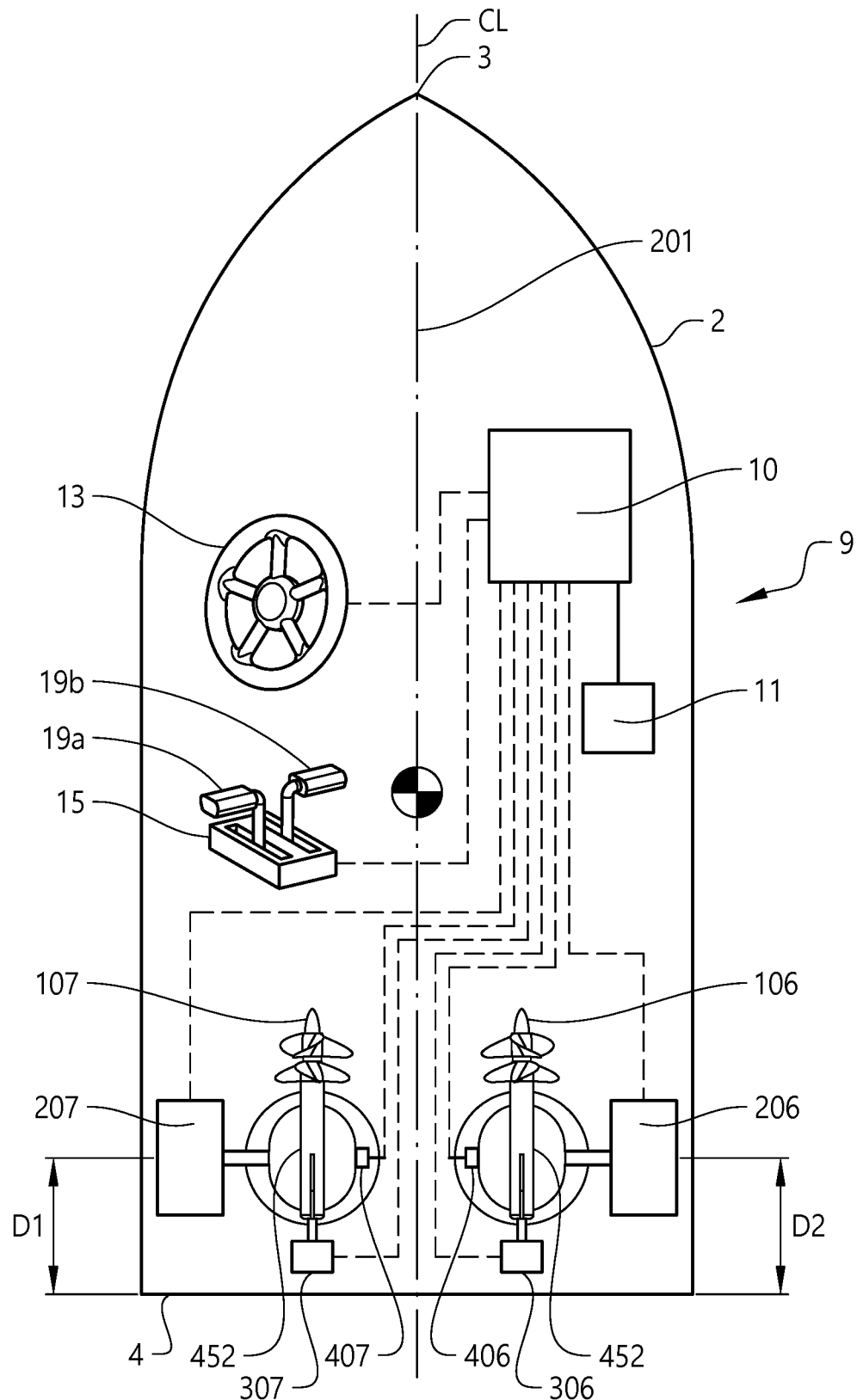
FIG. 2 is view of the vessel on FIG. 1 from underneath, with some components of a marine propulsion control system indicated schematically.

FIG. 2 shows the boat 1 from underneath. The hull is a V-hull, and a keel 201 extends along a longitudinal centreline CL of the hull.

The control of the propulsion units 106, 107 are performed by a marine propulsion control system 9. The control system includes a control unit 10, which may be provided as one physical unit, or a plurality of physical units arranged to send and receive control signals to and from each other. The control unit 10 may comprise computing means such as a CPU or other processing device, and storing means such as a semiconductor storage section, e.g., a RAM or a ROM, or such a storage device as a hard disk or a flash memory. The storage section can store settings and programs or schemes for interpreting input commands and generating control commands for controlling the propulsion units 106, 107.

Two internal combustion engines 206, 207 are provided in the vessel, each arranged to drive, via respective drivetrains, the propellers of a respective of the propulsion units 106, 107. The drivetrains may each comprise one or more shafts and one or more gear sets. The output torque of the engines 206, 207 can be controlled individually by the control unit 10. Thereby, the thrust delivery levels of the propulsion units 106, 107 are individually controllable. In alternative embodiments, the propellers may be driven by e.g. electric motors.

Two steering actuators 306, 307, which are controllable by the control unit 10, are arranged to rotate a respective steered part 452 of a respective of the propulsion units 106, 107, in relation to the hull 2 around a respective steering axis, which may be substantially vertical. Thus, the propulsion units 106, 107 are adjustable so as to individually change a respective steering angle of the propulsion units in relation to the hull 2. The steering actuators 306, 307 may include e.g. a hydraulic cylinder or an electrical motor.

In addition, the control unit 10 is arranged to select gears of the propulsion units, e.g. between forward, reverse, and neutral gears.

The control system further includes user command input devices including a steering wheel 13, and a thrust regulator 15. The control unit 10 is arranged to receive control signals from the user command input devices 13, 15.

In order for the control unit 10 to determine the rotational position of the propulsion units 106, 107, the marine propulsion control system comprises for each propulsion unit a system 406, 407, herein also referred to as a positioning system, for determining the position of a second device in relation to a first device. In this example, the second device is a respective of the steered parts 452 (FIG. 1) of a respective of the propulsion units 106, 107.

Figure 3:
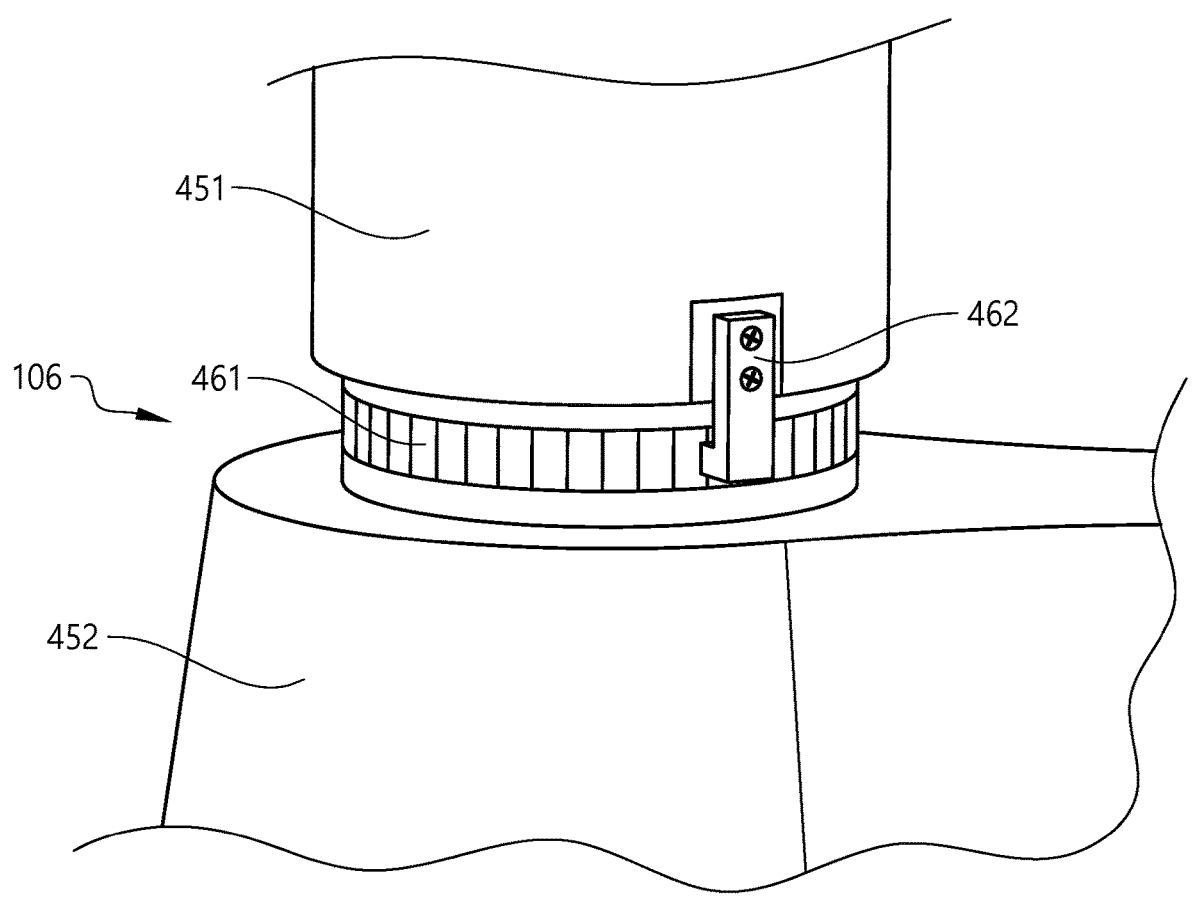
FIG. 3 shows a perspective view of a part of a propulsion unit of the marine propulsion control system with a positioning system according to an embodiment of the invention.

Reference is made also to FIG. 3, showing a portion of one of the propulsion units 106, where the latter extends through the hull (not shown). The first device, in relation to which the position of the steered part 452 is determined, is a portion 451 of the respective propulsion unit 106 which is fixed to the hull, herein also referred to as a fixed portion 451.

The positioning system 406 comprises an array 461 of fields, described closed below, which is fixed to the steered part 452. The positioning system 406 further comprises a sensor carrier 462, described closer below, which is fixed to the fixed portion 451.

It should be noted that in alternative embodiments, the array 461 of fields may be fixed to the fixed portion 451, and the sensor carrier 462 may be fixed to the steered part 452.

The array 461 of fields is in this embodiment a magnetizable track. The magnetizable track 461 is fixed to the steered part 452.

Figure 4:
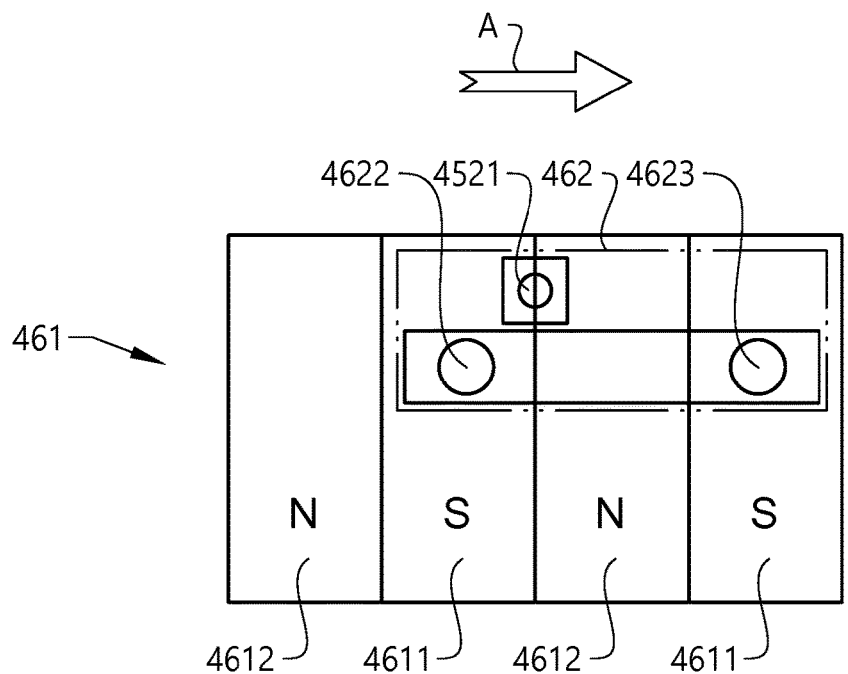
FIG. 4 and FIG. 5 show details of the positioning system in FIG. 3.

Reference is made also to FIG. 4. The magnetizable track comprises magnetic poles 4611, 4612. The magnetic poles form embodiments of what is herein referred to as first and second fields 4611, 4612. Thereby, the magnetizable track consists of a plurality of first fields 4611 presenting a first physical characteristic S, in this example magnetic south, and a plurality of second fields 4612 presenting a second physical characteristic N, in this example magnetic north. The first and second fields 4611, 4612 are arranged in an alternating manner along the magnetizable track 461.

The magnetizable track 461 may be formed by magnetizable rubber or a magnetic tape, known per se in encoder technology. The magnetizable track 461 may be vulcanized on to the steered part 452 (FIG. 3) via a holder, or directly. Alternatively, the magnetizable track 461 may be a multi-pole magnetic tape attached directly.

The magnetizable track 461 may extend around an entire cylindrical portion of the steered part 452 (FIG. 3). Thereby, angles up to +/−360 degrees may be provided. Except for an extended field, described below, the magnetic poles 4611, 4612 have the same extension along the array 461. The magnetic poles may have a width of less than 5 mm, preferably less than 3 mm, for example 1-2 mm. A typical accuracy may be +/−1 degree with a magnetic pole width of 2 mm & radius of 60 mm. A typical accuracy may be +/−0.5 degrees with a magnetic pole width of 1 mm and radius of 60 mm. The accuracy will increase with the radius.

The sensor carrier 462 carries a first sensor 4521 and a second sensor 4622. The sensor carrier 462 also carries a third sensor 4623, described below. The sensor carrier 462 may comprise an encapsulation of the sensors 4521, 4622, 4623. The first, second, and third sensors 4521, 4622, 4623 are in this example Hall sensors. Thereby, the sensors are arranged to register the magnetic fields of the magnetic poles 4611, 4612 in a non-contacting manner. Thus, the sensors 4521, 4622, 4623 are adapted to detect the magnetic south S or the magnetic north N in dependence of the positions of the sensors 4521, 4622, 4623 in relation to the magnetic poles 4611, 4612.

The distance between the first sensor 4521 and the second sensor 4622, along the array 461 of fields, is equal to half of a field extension along the array 461. In alternative embodiments, the distance between the first sensor 4521 and the second sensor 4622, along the array 461 of fields, is equal to a multiple of a full field extension and half of a field extension along the array 461. For example, where the extension of a pair of neighboring fields are designated as extending over 360 degrees, the distance between the first and second sensors may be 90 or 270 degrees.

Thereby, the position of the second sensor 4622 in relation to the first sensor 4521 is such that when the first sensor 4521 detects, during a movement of the steered part 452 in relation to the fixed device 451, a transition from the magnetic south S to the magnetic north N, or vice versa, the second sensor 4622 detects, during the transition, either the magnetic south S or the magnetic north N.

For example, during a movement of the array 461 in the direction indicated in FIG. 4 with the arrow A, the first sensor 4521 may detect a transition from the magnetic north N to the magnetic south S while the second sensor 4622 detects the magnetic south S. Also, during a movement of the array 461 in the same direction, when the first sensor 4521 detects a transition from the magnetic south S to the magnetic north N, the second sensor 4622 detects the magnetic north N.

During a movement of the array 461 in the direction opposite to the arrow A in FIG. 4, the first sensor 4521 may detect a transition from the magnetic south S to the magnetic north N while the second sensor 4622 detects the magnetic south S. Also, during a movement of the array 461 in the direction opposite to the arrow A in FIG. 4, when the first sensor 4521 detects a transition from the magnetic north N to the magnetic south S, the second sensor 4622 detects the magnetic north N.

Said example may be presented in a table as follows:

| Sensor 1 | Sensor 2 | Direction |
|----------|----------|-----------|
| N to S   | S        | A         |
| S to N   | N        | A         |
| S to N   | S        | Opp. A    |
| N to S   | N        | Opp. A    |

Thus, from these inputs, i.e. said unique combinations of transitions and states indicated by the sensors, the control unit 10 can determine the direction of movement. In the control unit the physical characteristics detected by the sensors may be represented by the binary numbers 0 and 1.

Figure 5:
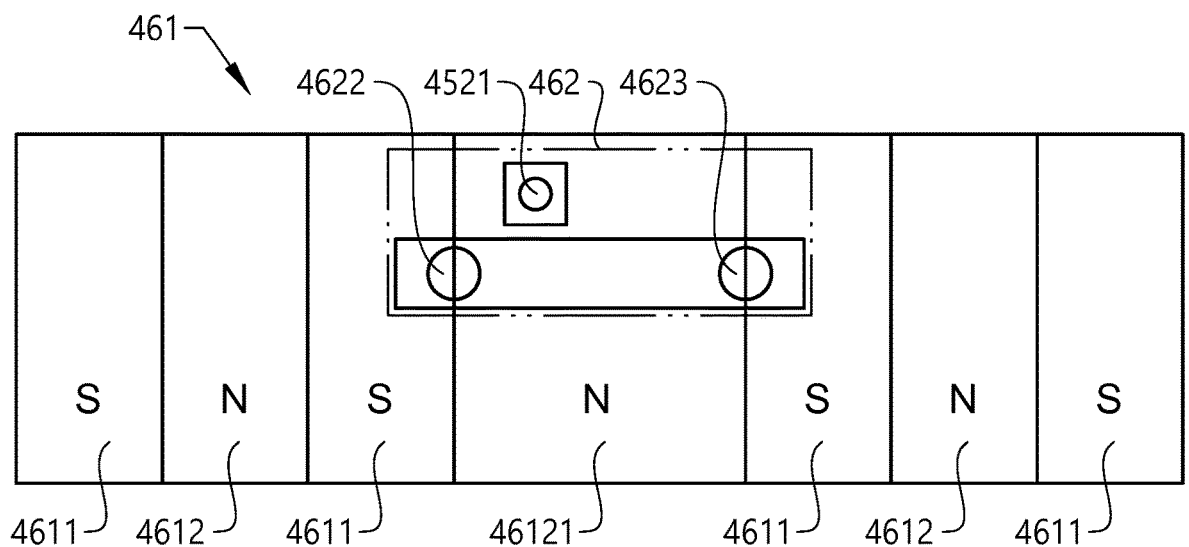

Reference is made also to FIG. 5. As suggested, the fields 4611, 4612 comprise an extended field 46121, which has, compared to other fields 4611, 4612, a larger extension along the array 461 of fields. The extended field provides what is herein referred to as a zero point, which the control unit may use to determine the absolute position of the steered part 452 (FIG. 3), e.g. at a system start-up. Once the steered part absolute position has been determined, changed thereof may be determining by the direction determination described above, and positioning by accumulative decoding. In this example, the extended field 46121 is a single magnetic N-pole with an extension along the array 461 which is twice as long as the extensions of the first and second fields 4611, 4612. In alternative embodiments, the extended field 46121 may be a single magnetic S-pole. Thereby, the first fields 4611 may be magnetic north poles, and the second fields 4612 may be magnetic south poles.

The distance between the second sensor 4622 and the third sensor 4623, along the array 461 of fields, is equal to the extension, along the array 461, of the extended field 46121. Thereby, when the second and third sensors 4622, 4623 detect respective transitions which are opposite, i.e. one from magnetic north N to south S, and the other from south S to north N, the control unit can determine that the steered part 452 is at the zero point. It is understood that such transitions occurred at opposite ends of the extended field 46121.

For example, where the extension of a pair of neighboring fields 4611, 4612, other than the extended field 46121, are designated as extending over 360 degrees, the distance between the first and second sensors 4521, 4622 may be 90 degrees, and the distance between the first and third sensors 4521, 4623 may be 270 degrees.

The control unit 10 may thus control operations of the propulsion units, through controlling the individually for each of the propulsion units the gear selection, delivered thrust and steering angle. The controlled operations are based at least partly on the input commands from the autopilot 11, the user command input devices 13, 15, and from the positioning systems 406, 407, described above. Control signals in the control system may be sent through communication lines or wirelessly.

Figure 6:
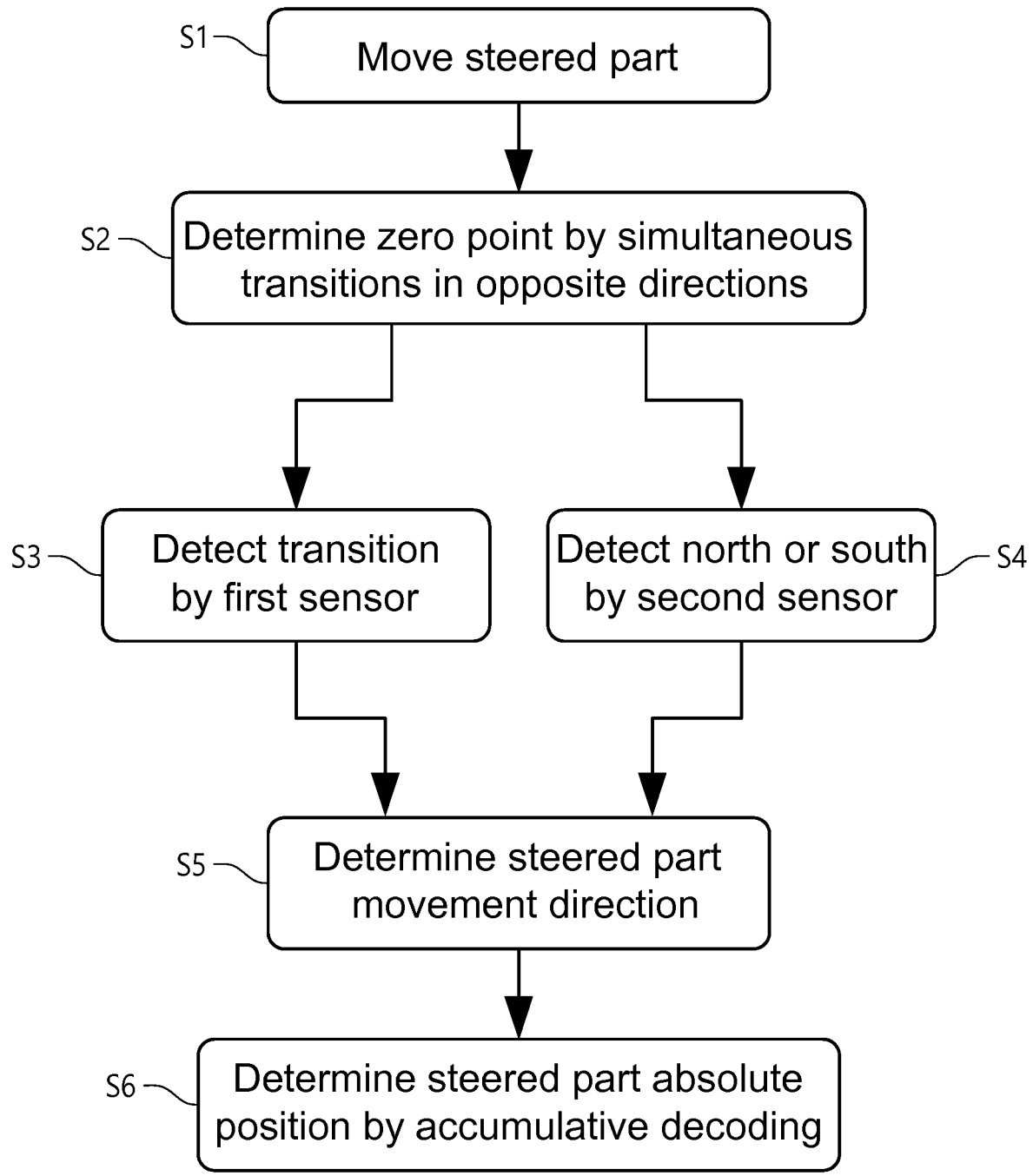
FIG. 6 is a block diagram depicting steps in a method for determining the position of a steered part of the propulsion unit in FIG. 3.

Reference is made also to FIG. 6, depicting steps in a method for determining the position of one of the steered parts 452 of the propulsion units. Upon start-up, the control unit controls the steering actuator 306 to move S1 the steered part 452, to detect the zero point. Thereby, the control unit determines S2 whether simultaneous transitions, detected by means of the second sensor 4622 and third sensor 4623, are in opposite directions, i.e. one from magnetic north N to south S, and the other from south S to north N. If so, the position of the steered part 452 is registered as the zero point.

Thereupon, the control unit detects S3, by means of the first sensor 4521, a transition from the magnetic south S to the magnetic north N, or vice versa, and detects S4 simultaneously, by means of the second sensor 4622, either the first physical characteristic S or the second physical characteristic N, whereby the direction of the movement of the steered part 452 is determined S5 as described above.

In addition, the control unit determines S6 the absolute position of the steered part 452 by accumulative decoding of the signals from one or more of the sensors 4521, 4622, 4623.

Figure 7:
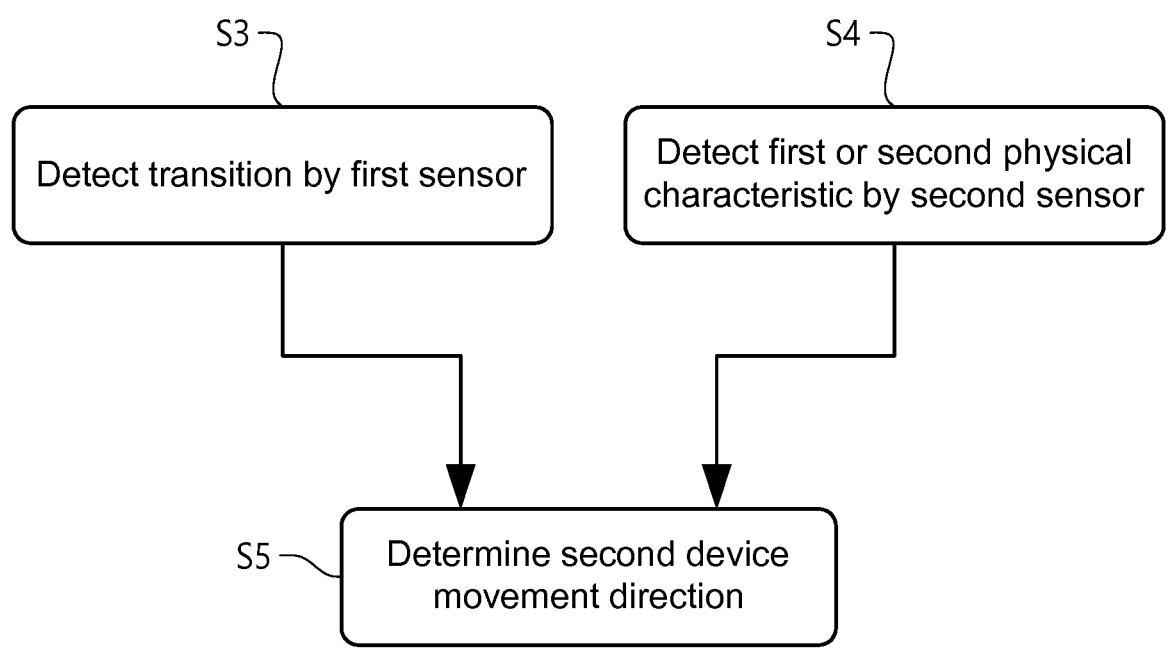
FIG. 7 is a block diagram depicting steps in an alternative method for detecting a position of a second device in relation to a first device.

Reference is made to FIG. 7, depicting steps in an alternative method for using a system for detecting a position of a second device in relation to a first device. The system comprising an array of fields, fixed to the first device, the fields consisting of a plurality of first fields presenting a first physical characteristic, and a plurality of second fields presenting a second physical characteristic, which is different from the first physical characteristic, the first and second fields being arranged in an alternating manner along the array of fields, the system further comprising a first sensor and a second sensor, fixed to the second device, wherein the first and second sensors are arranged to move along the array of fields when the second device moves in relation to the first device, the first and second sensors being adapted to detect the first physical characteristic or the second physical characteristic in dependence of the positions of the first and second sensors in relation to the fields.

The method comprises detecting S3, by means of a first sensor, and during a movement of the second device in relation to the first device, a transition from the first physical characteristic to the second physical characteristic, or vice versa. The method further comprises detecting S4, substantially simultaneously to the transition detection, by means of the second sensor, either the first physical characteristic or the second physical characteristic. The method further comprises determining S5, based on the detected transition and the detected physical characteristic, the direction of movement of the second device in relation to the first device.

It should be noted that for some embodiments of the invention, only two sensors are required. It should further be noted that said transition may be detected by means of the second sensor, and the simultaneous detection of the physical characteristic may be done by means of the first sensor.

Figure 8:
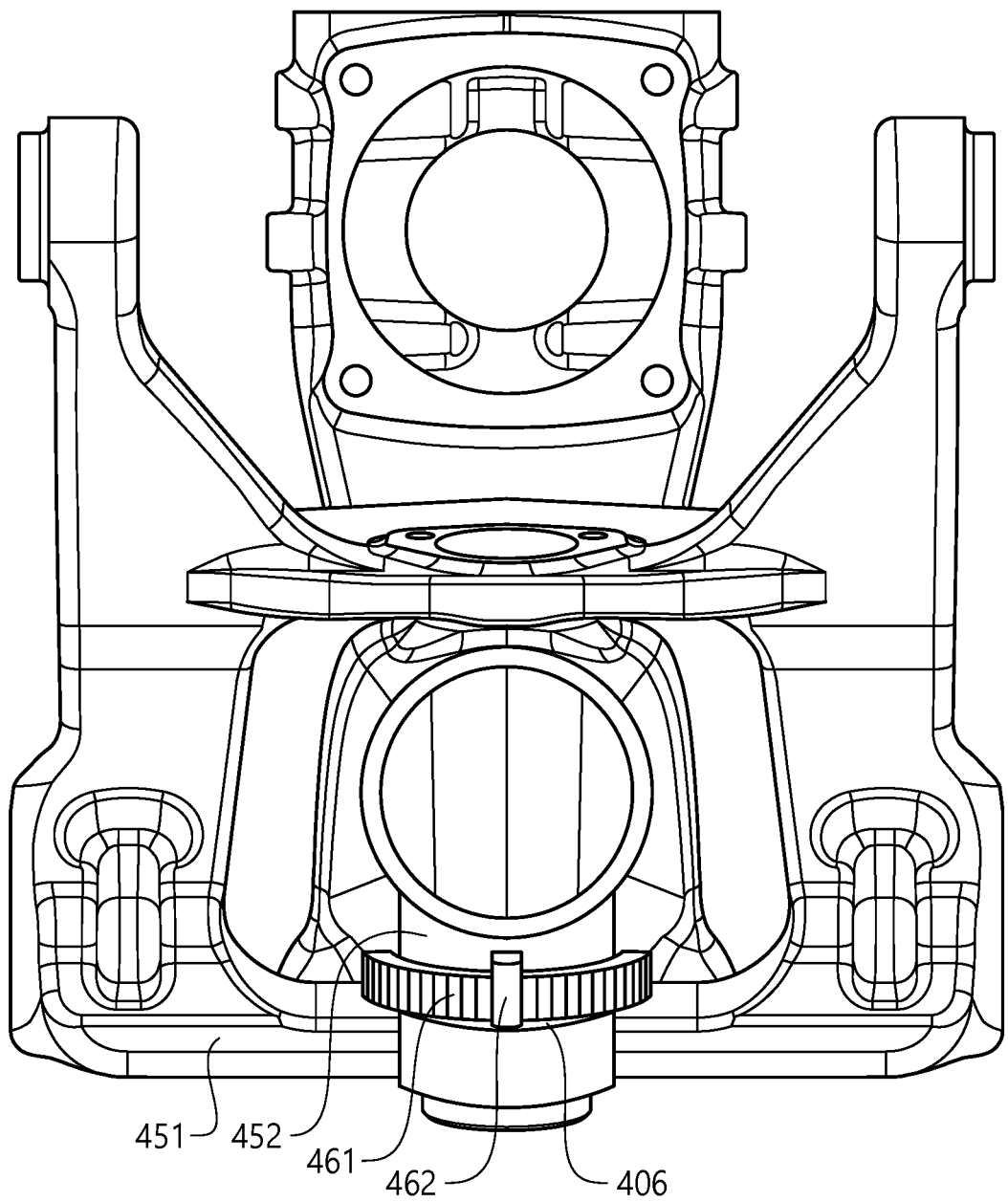
FIG. 8 is a perspective view of a portion of a marine vessel stern drive with a positioning system according to an embodiment of the invention.

It is understood that alternatives to the embodiments described are possible within the scope of the claims. As mentioned, the invention is equally applicable to other types of propulsion units, such as stern drives, fixed propeller and rudder combinations, or outboard engines. FIG. 8, shows an implementation of a positioning system 406 according to an embodiment of the invention, on a stern drive for a marine vessel. An array 461 of fields, such as the one described above with reference to FIG. 3-5, is fixed to a steered part 452 of the stern drive, and a sensor carrier 462, such as the one described above with reference to FIG. 3-5, is fixed to a fixed portion 451 of the stern drive.

The invention is also applicable to position measuring at straight movements.

It is to be understood that the present invention is not limited to the embodiments described above and illustrated in the drawings; rather, the skilled person will recognize that many changes and modifications may be made within the scope of the appended claims.

The invention claimed is:

1. A method for using a system for detecting a position of a second device in relation to a first device, the system comprising an array of fields, fixed to the first device, the fields consisting of a plurality of first fields presenting a first physical characteristic, and a plurality of second fields presenting a second physical characteristic, which is different from the first physical characteristic, the first and second fields being arranged in an alternating manner along the array of fields, where the fields comprise an extended field, which has, compared to other fields, a larger extension along the array of fields, and the system comprises a third sensor, fixed to the second device, the system further comprising a first sensor and a second sensor, fixed to the second device, wherein the first and second sensors are arranged to move along the array of fields when the second device moves in relation to the first device, the first and second sensors being adapted to detect the first physical characteristic or the second physical characteristic in dependence of the positions of the first and second sensors in relation to the fields, the method comprising detecting, by means of the first sensor, and during a movement of the second device in relation to the first device, a transition from the first physical characteristic to the second physical characteristic, or vice versa, detecting, substantially simultaneously to the transition detection, by means of the second sensor, either the first physical characteristic or the second physical characteristic, and determining, based on the detected transition and the detected physical characteristic, the direction of movement of the second device in relation to the first device, characterized by determining whether the transition detected by means of the first sensor, or a transition detected by means of the second sensor, is a transition from the first physical characteristic to the second physical characteristic, determining whether a transition, detected by means of the third sensor, and substantially simultaneously to the transition detected by means of the first sensor or the second sensor, is a transition from the first physical characteristic to the second physical characteristic, and determining, based on the determinations whether the transitions were transitions from the first physical characteristic to the second physical characteristic, whether the transitions occurred at opposite ends of the extended field.

2. A method according to claim 1, characterized in that the first physical characteristic is a first magnetic polarity, and the second physical characteristic is a second magnetic polarity, which is opposite to the first magnetic polarity.

3. A method according to claim 1, wherein the detection of the transition from the first physical characteristic to the second physical characteristic, or vice versa, is caused by the relative movement of the first sensor from a first field to a second field, or vice versa, respectively.

4. A method according to claim 1, characterized in that a plurality of the fields, provided in addition to the extended field, have the same extension along the array.

5. A computer program comprising program code means for performing the steps of claim 1 when said program is run on a computer.

6. A computer readable medium carrying a computer program comprising program code means for performing the steps of claim 1 when said program product is run on a computer.

7. A control unit configured to perform the steps of the method according to claim 1.

8. A marine propulsion control system comprising a control unit according to claim 6.

9. A marine vessel comprising a marine propulsion control system according to claim 7.

10. A system for determining the position of a second device in relation to a first device, where the system comprises an array of fields, arranged to be fixed to the first device, the fields consisting of a plurality of first fields presenting a first physical characteristic, and a plurality of second fields presenting a second physical characteristic, which is different from the first physical characteristic, the first and second fields being arranged in an alternating manner along the array of fields, wherein the fields comprise an extended field, which has, compared to other fields, a larger extension along the array of fields, the system further comprising a first sensor and a second sensor, arranged to be fixed to the second device, wherein the first and second sensors are arranged to move along the array of fields when the second device moves in relation to the first device, the first and second sensors being adapted to detect the first physical characteristic or the second physical characteristic in dependence of the positions of the first and second sensors in relation to the fields, characterized in that the extensions of the fields along the array, and the position of the second sensor in relation to the first sensor are such that when the first sensor detects, during a movement of the second device in relation to the first device, a transition from the first physical characteristic to the second physical characteristic, or vice versa, the second sensor detects, during the transition, either the first physical characteristic or the second physical characteristic, and in that the system comprises a third sensor arranged to be fixed to the second device, and the distance between the first sensor and the third sensor, or between the second sensor and the third sensor, along the array of fields, is equal to the extension, along the array, of the extended field.

11. A system according to claim 9, characterized in that a plurality of the fields have the same extension along the array.

12. A system according to claim 10, characterized in that all of, or a plurality of, the fields having the same extension along the array, are arranged one after the other along the array.

13. A system according to claim 9, characterized in that the distance between the first sensor and the second sensor, along the array of fields, is equal to a partial field extension, which is less than a full field extension, or equal to the sum of a multiple of a full field extension and a partial field extension, where said full field extension is the extension along the array of any field, or, where the extension along the array of one or more fields is different from the extension along the array of one or more of the remaining fields, the extension along the array of a field having the smallest extension along the array.

14. A system according to claim 9, characterized in that the first and second sensors are hall sensors.

15. A marine vessel comprising a system according to claim 9, characterized in that one of the first and second devices is fixed in relation to a hull of the marine vessel, and the other of the first and second devices is fixed to a steered part of a propulsion unit of the marine vessel, or to a rudder of the marine vessel.

* * * * *